United States Patent Office 2,719,680
Patented Oct. 4, 1955

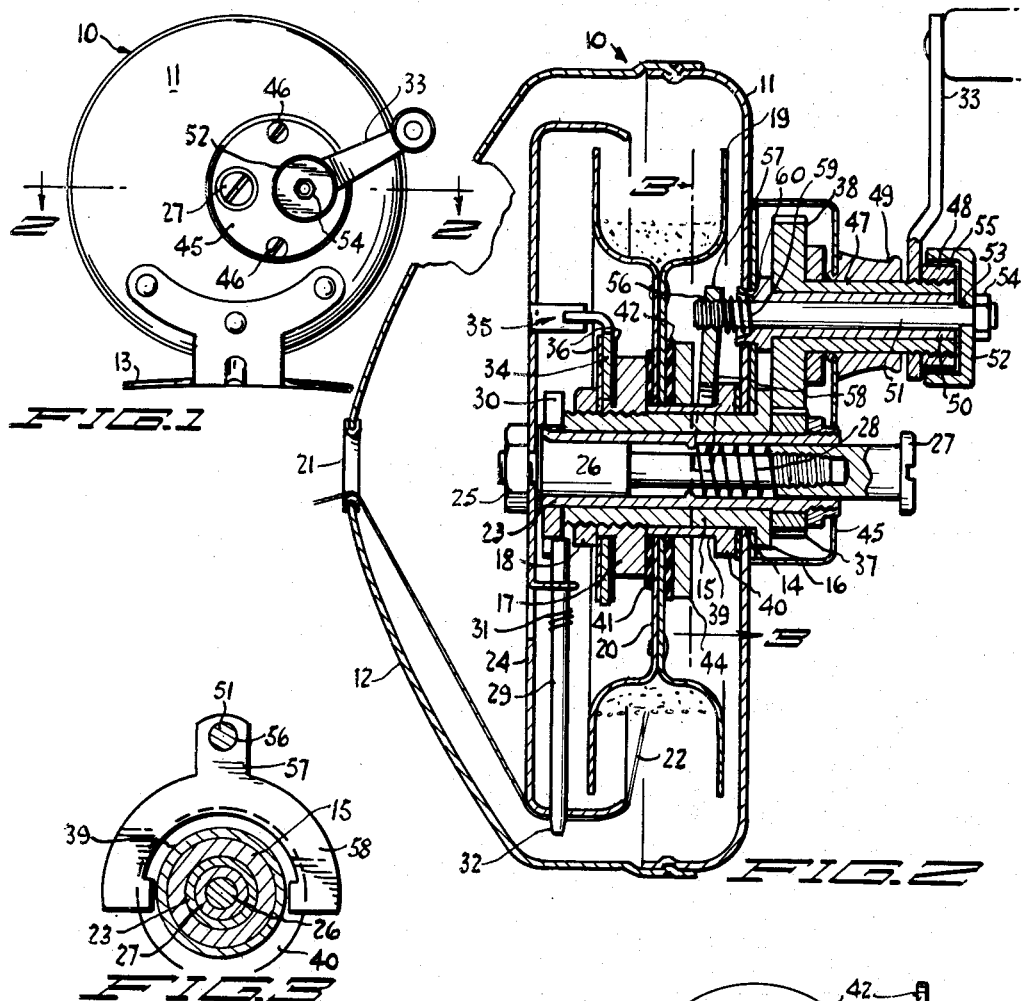

2,719,680

DRAG FOR SPINNING REEL

Henry Warren Denison and Lloyd E. Johnson, Mankato, Minn., assignors to Denison-Johnson, Inc., Mankato, Minn., a corporation of Minnesota Application November 7, 1952, Serial No. 319,208

4 Claims. (Cl. 242—84.5)

This invention relates generally to improvements in fishing reels of the type now widely used in the practice of the spinning methods of fishing, and more particularly relates to an improved drag mechanism for such reels.

The present invention is also an improvement specifically in the type of fishing reels shown in our prior applications Serial No. 179,188, filed August 14, 1950, now Patent No. 2,644,647, and Serial No. 247,304, filed September 19, 1951, now Patent No. 2,667,312. In these reels the spinning line is coiled upon a line spool, located in a suitable frame or housing upon a bearing assembly therein and the line in actual operation is coiled upon the spool by means of a spooling member, which is rotated by a crank and which member has a normally projecting pin for spooling the line. Said spooling member is also adjustable in an axial direction by means of an exposed control button and when so positioned the said pin is withdrawn and the line may peel or flow off the end of the spool, while the spool remains stationary, in accordance with the spinning principle. It is necessary, however, to provide means for permitting precisely adjustable and restricted rotation of the normally stationary spool and this drag mechanism, as it is called, is for the purpose of permitting a heavy fish to take line off of the spool, even though the spooling member may be in operation to reel in the line, to thus act as a safety factor and prevent breakage of the line.

Inasmuch as the fishing lines used for spinning are in many cases of very low tensile test, it follows that this drag mechanism must be very precisely adjustable so that rotation of the spool will be permitted when the pull upon the line is slightly less than the breaking strength thereof. It is accordingly the primary object of our present invention to provide drag mechanism having the desired characteristics of precise adjustment, the ability to maintain this adjustment once it is made, and which is of simple and durable construction. A further object is to provide drag mechanism in which the drag force exerted upon the spool may be adjusted from a low minimum to a maximum of high magnitude and in which the power of a leverage action is used for accomplishing this purpose.

These and other more detailed and specific objects will be disclosed in the course of the following specification, reference being had to the accompanying drawings, in which—

Fig. 1 is a side elevation of a spinning reel according to our invention.

Fig. 2 is an enlarged and substantially diametrical section through the reel taken approximately along the line 2—2 in Fig. 1.

Fig. 3 is a cross sectional view of the center portion of the mechanism as taken substantially along the line 3—3 in Fig. 2.

Fig. 4 is a detail in elevation and in diametrical section of the center portion of the reel and the elements constituting our improved drag mechanism.

Fig. 5 is a composite side and edge view of one of the drag disks.

Inasmuch as the reel mechanism per se as here disclosed is substantially identical to that described in detail in our corresponding prior applications, the description will be condensed herein and to a point only necessary for an understanding of the present invention. Referring then more particularly and by reference characters to the drawing, the reel comprises a frame or housing, designated generally at 10, having a circular frame or side plate 11 with a peripheral flange over which there is removably fitted a conical cover 12, as best seen in Fig. 2. The usual tang 13 is secured to the side plate for mounting the reel upon the fishing rod and at the center the side plate has an opening 14 in which there is mounted a tubular, stationary bearing 15. On the outer side of the plate this bearing is enlarged at 16 and within the reel the opposite end of the bearing is threaded to accommodate, in succession, a tapped retainer nut or stop 17 and a lock nut 18. Mounted about the bearing 15 is a line spool 19 constructed as clearly shown and having an apertured and flat center portion 20 fitted over the bearing. The cover 12 is provided with a line guide or eyelet 21 on the axis of the bearing 15 and in practice the line, designated at 22, which is coiled upon the spool is payed out or taken in through this line guide, as indicated.

Rotatably mounted through the bearing 15 is a tubular shaft 23 and at one end thereof there is located a circular line spooling member 24, which is fixed by a nut 25 on a shaft 26, slidably mounted out through the shaft 23. A control button 27 is threaded on the outer end of the shaft 26 and is exposed at the outer center of the reel so that the angler may operate the same by pushing it inward against the resistance of a spring 28 to move the spooling member 24 from the operative, spooling position illustrated in Fig. 2 axially away from the spool. This motion of the spooling member 24, by the control button 27, carries a spooling pin 29 off a cam 30 which is secured to the inner end of the tubular shaft 23 and this pin, which is slidable radially of the spooling member, will then be moved inward by the action of a spring, a part of which appears at 31, until the end 32 of the pin is flush with the rim of the spooling member. In such condition the line 22 may obviously flow freely off the end of the spool 19, without rotation thereof.

To pick up and respool the line the tubular shaft 23 is rotated by means of a crank 33, turning the sam 30 until its low point or point nearest the axis of rotation registers with the pin 29, whereupon the spring 28 will reassert itself and will return the spooling member to its operative position adjacent the spool, and the continued rotation of the shaft 23 will cause the cam 30 to project the pin 29 outward, its end 32 then respooling the line. The necessary braking force upon the spooling member 24, so that the cam 30 will turn with reference thereto in again picking up and reprojecting the pin 29, is provided by a brake disk 34 held between the nuts 17 and 18 and engaging the spooling member, as indicated at 35, there being spring washers 36 at opposite sides of the disk 34 to frictionally resist rotation thereof.

This in general is the construction of the reel forming the subject matter of our earliest filed application and it is believed that no further description should be necessary herein. Various refinements of the bearing construction here shown are also found in our second application and in accordance therewith the present disclosure illustrates the tubular shaft 23 as driven by a pinion 37 and a larger gear 38 to which the crank 33 is connected, in order to speed up the retrieve of the line. Since certain details of the bearing structure and gear and crank arrangement are also necessary to an understanding of this invention, they will now be set forth in the description of the drag mechanism.

Fitted upon the bearing 15 is a hollow center sleeve 39 diametrically enlarged at the end adjacent the side plate 11 forming an annular fulcrum or shoulder 40. At opposite sides the center 20 of the spool 19 is engaged by drag disks 41 and 42, both of which have large center openings at 43 to accommodate the bearing assembly and which are thus of washer-like shape. The drag disk 41 bears against the retainer or stop 17 thus limiting axial movement of the spool away from the side plate 11, while the opposite drag disk 42 is thrust against the spool by means of a washer-shaped follower 44 which is spaced from the aforesaid fulcrum 40. The gears 37—38 are accommodated within a gear casing 45 secured by screws 46 to the side plate 11, and the gear 38 has a hollow, elongated hub 47 on which the crank 33 is fitted and secured as usual by a crank nut 48. The usual bearing 49 extends outward from the gear case 46. The tubular hub 47 of the gear is also rotatably mounted upon a stationary, and also tubular, bearing post 50 which is secured at its inner end to the side plate 11 and extends outwardly therefrom to the center of the crank. A drag shaft 51 is rotatably mounted through the bearing post 50 and at its outer end carries a knurled drag adjusting knob 52 non-rotatably mounted at 53 on the shaft and held thereto by a nut 54. As seen in Fig. 2 this knob 52 is hollowed out at 55 to clear but enclose the crank nut 48. The inner end of the drag shaft 51 is threaded into a tapped opening 56 at one end 57 of a drag adjusting fork 58, the bifurcated ends of which extend to the axis of the spool between the follower 44 and fulcrum 40 and engage the former at diametrically opposed points (Fig. 3). An expansion coil spring 59 is engaged between the end 57 of the fork and the counterbored inner end 60 of the bearing post 50 to exert spring pressure against the fork in a direction inwardly and away from the side plate 11.

In the operation of the reel it will be noted that a pull upon the line 22, when the spooling member 24 is in its operative position and spooling the line upon the spool, might well cause the line to break unless the spool is permitted to revolve. Should a heavy fish strike the lure the line might thus be broken, but the drag here presented will permit the spool to turn and the line to pay out, even though the crank 33 may continue to turn in the angler's effort to retrieve line. Thus the drag mechanism acts as a safeguard against the breakage of the line and is adjusted so that the line may pay out when the pull thereon is slightly less than the tensile strength of the line. In accordance with our present invention this drag is adjusted by turning the knurled knob 52 which rotates the shaft 51 and causes its threaded inner end to move the end 57 of the fork 58 toward and away from the side plate 11. Between this end 57 and the bifurcated ends of the fork the fulcrum 40 engages the fork so that such adjustment very precisely affects the leverage exerted by the fork between the fulcrum and the adjacent follower 44. Thus as viewed in Fig. 2 the motion of the upper end of the fork to the right and toward the side plate 11 will rock the same about the fulcrum 40 (the threaded connection having sufficient play for the purpose) and increase the pressure of the bifurcated ends of the fork against the follower, increasing the magnitude of the frictional pressure of the drag disks 41 and 42 upon the opposite sides of the spool. Inasmuch as the spring 59 opposes this adjustment of the fork, the spring does not in itself exert the drag but it does contribute to maintaining the adjustment once it is made. Actual practice demonstrates that the drag force upon the spool not only may be quite precisely adjusted, and due to the leverage by which the force is applied a drag of comparatively high magnitude may be exerted without difficulty.

The drag disks 41 and 42 are preferably made up from a non-metallic and self-lubricating material, such as sheet nylon impregnated with graphite, and which material is commercially available.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a fishing reel of the character described, a frame, a stationary bearing in the frame, a line spool rotatably mounted on the bearing, a spooling member for spooling line on the spool, means extending through the bearing for rotating and operating said spooling member, a crank located off the center of the bearing and gears connecting the crank to the spooling member, a drag mechanism including a drag disk operative on the spool to resist rotation thereof, a fork for positioning the drag disk and urging the same against the spool, and a drag operating shaft adjustably connected to the fork and extending outward through the axis of the crank.

2. For a spinning reel of the character described having a frame side plate and a stationary bearing thereon, a line spool mounted on the bearing and stop means holding the spool against axial displacement away from the plate, and means for spooling line on the spool and for permitting line to flow off the spool while the same remains stationary; the improvement which comprises drag disks engaging opposite sides of the reel at its center, a sleeve on the bearing and having a diametrically enlarged end braced against the side plate and forming a fulcrum, a follower disk between the fulcrum and the drag disk at the adjacent side of the reel, a fork having a bifurcated end located between the fulcrum and follower, and means for swinging the fork in a radial plane with respect to the axis of the spool into contact with the fulcrum to exert adjustable leverage on the follower.

3. For a spinning reel of the character described having a frame side plate and a stationary bearing thereon, a line spool mounted on the bearing and stop means holding the spool against axial displacement away from the plate, and means for spooling line on the spool and for permitting line to flow off the spool while the same remains stationary; the improvement which comprises drag disks engaging opposite sides of the spool at its center, a sleeve on the bearing and having a diametrically enlarged end braced against the side plate and forming a fulcrum, a follower disk between the fulcrum and the drag disk at the adjacent side of the reel, a fork having a bifurcated end located between the fulcrum and follower, a shaft threaded through the fork and operative to urge the same against the fulcrum to exert leverage on the follower toward the spool, and a spring on said shaft for urging the fork in an opposite direction.

4. For a spinning reel of the character described having a frame side plate and a stationary bearing thereon, a line spool mounted on the bearing and stop means holding the spool against axial displacement away from the plate, and means for spooling line on the spool and for permitting line to flow off the spool while the same remains stationary; the improvement which comprises drag disks engaging opposite sides of the spool at its center, a sleeve on the bearing and having a diametrically enlarged end braced against the side plate and forming a fulcrum, a follower disk between the fulcrum and the drag disk at the adjacent side of the reel, a fork having a bifurcated end located between the fulcrum and follower, a crank for operating the reel, a drag shaft journaled through the axis of the crank and having a threaded connection at one end with the fork, and a knob on the other end of the drag shaft at the center of the crank for adjusting the fork against the fulcrum and exerting adjustable leverage against the follower.

References Cited in the file of this patent

UNITED STATES PATENTS

| | | |
|---|---|---|
| 1,024,739 | Murgas | Apr. 30, 1912 |
| 1,892,541 | Smelser | Dec. 27, 1932 |
| 2,502,814 | Bater | Apr. 4, 1950 |
| 2,581,941 | Shinn et al. | Jan. 8, 1952 |
| 2,600,558 | Mauborgne | June 17, 1952 |
| 2,621,869 | McCash | Dec. 16, 1952 |
| 2,644,647 | Denison et al. | July 7, 1953 |
| 2,667,312 | Denison et al. | Jan. 26, 1954 |